United States Patent

Puppe et al.

[11] Patent Number: 5,098,448
[45] Date of Patent: Mar. 24, 1992

[54] PROCESS FOR THE PRODUCTION OF MOLECULAR SIEVE GRANULATES

[75] Inventors: Lothar Puppe, Burscheid; Günter Ulisch, Leverkusen, both of Fed. Rep. of Germany

[73] Assignee: Bayer Aktiengesellschaft, Leverkusen, Fed. Rep. of Germany

[21] Appl. No.: 680,601

[22] Filed: Apr. 1, 1991

Related U.S. Application Data

[63] Continuation of Ser. No. 448,027, Dec. 8, 1989, abandoned, which is a continuation of Ser. No. 272,605, Nov. 17, 1988, abandoned, which is a continuation of Ser. No. 917,639, Oct. 10, 1986, abandoned, which is a continuation of Ser. No. 692,603, Jan. 17, 1985, abandoned.

[30] Foreign Application Priority Data

Jan. 18, 1984 [DE] Fed. Rep. of Germany ....... 3401485

[51] Int. Cl.$^5$ ..................... C01B 33/34; C01B 33/113
[52] U.S. Cl. .................. 23/313 P; 423/328; 502/70; 23/313 AS
[58] Field of Search .......... 23/313 P, 313 AS, 293 R; 502/70; 423/328, 338, 335, 274, 659, 329

[56] References Cited

U.S. PATENT DOCUMENTS

| | | | |
|---|---|---|---|
| 3,275,571 | 9/1966 | Mattox | 502/70 |
| 3,356,450 | 12/1967 | Heinze | 23/112 |
| 3,886,094 | 5/1975 | Pilato et al. | 502/70 |
| 3,894,964 | 7/1975 | Roebke et al. | 252/448 |
| 4,249,903 | 2/1981 | Smolka | 23/313 AS |
| 4,414,130 | 11/1983 | Cheng | 23/313 AS |

FOREIGN PATENT DOCUMENTS 2642518 3/1978 Fed. Rep. of Germany .
974644 11/1964 United Kingdom .

OTHER PUBLICATIONS

Donald W. Breck, pp. 138, 143 and 162, 181–183, Zeolite Molecular Sieves, Structure, Chemistry, and Use, 1974.

*Primary Examiner*—Kenneth M. Schor
*Attorney, Agent, or Firm*—Sprung Horn Kramer & Woods

[57] ABSTRACT

A process for the production of silica-bound zeolite granulates is disclosed, wherein zeolite to be formed into a granulate is mixed with silica sol. The process is carried out by adding aqueous alkali metal silicate to the silica sol immediately before the silica sol is mixed with the solid zeolite to be granulated. By the described process, granulates of various grain sizes can be obtained, and the resultant granulates can have a narrow grain size distribution.

11 Claims, No Drawings

PROCESS FOR THE PRODUCTION OF MOLECULAR SIEVE GRANULATES

This application is a continuation of application Ser. No. 07/448,027 filed 12/08/89 and now abandoned, which is a continuation of application Ser. No. 07/272,605 filed 11/17/88 and now abandoned, which is a continuation of application Ser. No. 06/917,639 filed 10/10/86 and now abandoned, which is a continuation of application Ser. No. 06/692,603 filed 01/17/85 and now abandoned.

This invention relates to a process for the production of spherical zeolite granulates.

BACKGROUND OF THE INVENTION

Granulates can be produced from powder-form solids by various processes, for example by pressing, extrusion, rolling granulation and drop granulation (cf. for example H. B. Ries, Aufbereit. Techn. 3/5, page 147, 1970).

The last two methods give spherical granulates which may be used with advantage for adsorption purposes by virtue of their favorable flow properties. Solids which do not have any binding power of their own require a binder for conversion into a granulate of adequate strength. Silica sol/silica gel and silicate solutions have already been used for that purpose.

Silica-bound granulates may be produced using silicate solutions and acid or stable silica sol. Sols of silicate solution and acid have the disadvantage that their scope for processing is too narrow for application on an industrial scale.

In addition, some materials which it is desired to convert into granulate form are unable to tolerate acidic reactions. This is the case, for example, with most of the molecular sieve zeolites used for adsorption purposes.

Several processes based on the sol-gel method using the solidification of an unstable sol of silicate solution and acid, with which finely powdered solids may also be mixed, in inert solvents have already been proposed for the production of catalysts (cf. for example U.S. Pat. No. 2,689,226, German Offenlegeschrift 24 13 284).

Molecular sieve zeolites may be similarly converted into spherical granulates by the sol-gel method using stable silica sol and adding a small amount of a magnesium oxide suspension as gelating agent. Although processes such as these produce a very uniform spherical granulate, they are relatively complicated and, on account of the water-immiscible solvent, require elaborate measures for removing and working up the solvent.

It has also been proposed (German Offenlegeschrift 22 33 070) to granulate molecular sieve zeolites by rolling granulation on a granulating pan in which originally stable silica sol adjusted shortly before use to a pH-value of 4–9 by the addition of a small quantity of acid to reduce stability is sprayed onto the zeolites. In this process, the solgel conversion takes place during rolling granulation in the pan. Granulates with very weak $SiO_2$-bridges between the zeolite particles are formed in this process. In addition, the formation of salts with the necessary alkaline reaction media during subsequent conversion of the $SiO_2$-binder into zeolite is a disadvantage.

German Auslegeschrift 11 64 995 describes the production of molecular sieve granulate by mixing the hydrated washed zeolite with stable silica sol which normally has a pH-value of from 9 to 10.

The solidification of the silica-sol-containing zeolite granulate, i.e. the conversion of the sol into the gel, only takes place at temperatures above 100° C. or during the subsequent activation step at 300°–350° C. One of the disadvantages of this process is that the granulates are only capable of withstanding very light mechanical loads before the sol-gel conversion and, accordingly, have to be treated very carefully in order not to damage the structure of the granules, for example during sifting or transport.

In the above-mentioned sol-gel processes, the granules harden suddenly after mixing following an induction period of a few seconds. A hardening process which begins suddenly after only a few seconds is hardly suitable in cases where granulation is carried out by pressing, extrusion, roll granulation or by the preferred process of build-up granulation into beads.

These disadvantages are avoided by a process known from German Offenlegeschrift 26 42 518 in which small quantities of finely powdered alkali silicate are dry-mixed with the solid to be granulated so that a certain molar ratio of $Me_2O$ to $SiO_2$ is adjusted during addition of the silica sol and the granulate is subjected to ageing treatment. The advantage of this process lies in a length of time favorable for processing on an industrial scale. Hardening begins gradually rather than suddenly after an induction period of a few minutes to a few hours which may be regulated through the molar ratio of $Me_2O$ to $SiO_2$.

The disadvantage of this known process is that very small quantities of alkali silicate have to be mixed with a large quantity of zeolite. The difficulty here is that small quantities of solids have to be measured off within the necessary tolerance using either mechanical balances or similar metering systems in a continuously operating installation. Another problem is obtaining adequate distribution of the alkali silicate in the large quantity of zeolite in a reasonable mixing time.

SUMMARY OF THE INVENTION

Accordingly, the object of the present invention is to provide a process for granulating zeolites which does not have any of the above-mentioned disadvantages, but which retains the advantages of an adjustable gelation period.

The present invention relates to a process for the production of silica-bound, preferably spherical zeolite granulates by mixing the finely powdered solid to be granulated with aqueous silica sol having an $SiO_2$-content of more than 5% and a specific surface of the particles of greater than 100 $m^2/g$, characterized in that, immediately before spraying, aqueous alkali silicate is added to and mixed with the aqueous silica sol through suitable injectors preceding the outlet opening in such a quantity that a molar ratio of $Me_2O$ (alkali metal oxide) to $SiO_2$, expressed as an overall ratio, of from 1:5 to 1:80 and preferably from 1:10 to 1:50 is established.

Thereafter, the zeolite granulate may be tempered at 30° to 500° C. and preferably at up to 200° C. before it is sieved and activated and/or after-treated.

In contrast to the process described in German Offenlegeschrift 26 42 518, the alkali silicate is metered through a liquid metering unit, for example a through-flow meter, which enables the desired mixing ratios to be continuously regulated.

In addition, this guarantees homogeneous mixing of the aqueous silica sol with the aqueous alkali silicate making the sol-gel conversion process controllable and reproducible.

The hardening process may be regulated to last for a few seconds to a few hours, preferably for between 0.1 and 60 minutes, in dependence upon the mixing ratio of silica sol to alkali silicate.

It has also been found that the size of the granules may be controlled through the readily adjustable mixing ratio of silica sol to alkali silicate. Hitherto, it has only been possible, in rolling granulation using granulation pans, to obtain particle diameters in a narrow distribution beyond a limit of 1-2 mm. If it is desired to obtain a grain fraction of $\geq 1$ mm, so-called pre-granulate has to be continuously fed into the granulation pan and the small particle size built up with a calculated, small input of powder and granulation liquid.

In the process according to the invention, it is possible by build-up granulation to obtain a narrow grain size distribution of 0.5 to 1.5 mm for example, without pre-granulate having to be continuously introduced, providing the ratio of silica sol to waterglass is adjusted in such a way that hardening takes place in 10 to 30 seconds. The sol/waterglass granulation process provides for exact adjustment of the silica sol/waterglass mixture which in turn provides for reproducible hardening behavior.

Compared with processes in which silica sol is used on its own as binder, the process according to the invention produces higher granulate strength values, even in the moist state, and—after drying—even greater hardness values and complete resistance to water.

The process according to the invention may be used for granulating and binding a variety of different powderform zeolitic molecular sieves such as, for example, zeolite A, zeolite X, zeolite Y, erionite, zeolite L, NaPl, mordenite, zeolite T, chabasite, ZSM 5. These zeolites are only mentioned as examples and do not limit the process according to the invention in any way.

Sodium and/or potassium waterglasses for example may be used as the aqueous alkali silicate. Sodium waterglass in which the molar ratio of $Na_2O$ to $SiO_2$ is between 1:2 and 1:4 is preferred, technical soda waterglass having a molar composition of $Na_2O.3\ SiO_2$ being particularly suitable.

The waterglass is added to and mixed with the silica sol via throughflow meters immediately before the silica sol is sprayed on and before it leaves its outlet opening, for example in the form of a nozzle. Mixing with the sol takes place over a very short mixing zone and is completed within the nozzle.

The silica sol is normally obtained from the H-ion exchange treatment of waterglass solution followed by concentration through evaporation at a pH-value kept in the range from 8 to 10. In this way, it is possible to obtain stable silica sols differing in particle size. Particle size is characterized by the specific BET surface which may be determined from the silica gel obtained by drying the weakly acidified sol. Sols containing relatively coarse particles corresponding to a specific surface of 100 $m^2/g$ and small are not really suitable for the process according to the invention. Sols eminently suitable for use in the process according to the invention are those having specific surfaces of from 150 $m^2/g$ to 800 $m^2/g$ and preferably from 200 to 600 $m^2/g$, as determined by the BET method. The still stable, storable maximum concentration is substantially inversely proportional to the specific surface of the particles.

Standard commercial concentrations of $SiO_2$ are of the order of 5 to about 40% by weight and preferably of the order of 10 to 30% by weight.

Apparent density may be controlled not only by changing the granulation parameters, but also by adjusting the silica sol used as the granulation liquid to low $SiO_2$-concentrations by preliminary mixing with water.

The zeolite powder is converted into granulate by the method of rolling granulation. The molecular sieve is introduced whilst at the same time the silica sol, to which a small quantity of alkali silicate, preferably soda waterglass, is added immediately before the spray nozzle, is sprayed on in measured quantities. Mixing takes place by injecting the waterglass into the main stream of silica. The two components are thoroughly mixed on their way to, and inside, the nozzle. Premature gelation of the sol before the nozzle is undesirable because it can result in very rapid blockage of the nozzle. The hardening time of the silica sol may be adjusted as required to between a few seconds and several minutes. A hardening time of from 0.1 to 60 minutes is preferably selected. In this connection, it has been found that, in contrast to the prior art, a small grain fraction of $\geq 1.5$ with a narrow distribution may be obtained by the process according to the invention.

The average grain sizes of $\geq 2$ mm may be controlled in known manner by varying the rotational speed and inclination of the pan, the throughput of powder mixture, the degree of moisture and, in accordance with the invention, through the gelation time of the silica sol.

The granules which have reached a certain size during the granulation process and have acquired a certain degree of granulation are discharged from the pan without any auxiliaries.

In a following tempering step and/or an ageing treatment lasting several hours, the granules acquire their final resistance to water which is necessary for the further treatment of the granulate.

The granulate is subjected to an activation step at 300° to 500° C. either directly of after an ion-exchange step and, in one particular embodiment of the invention, is treated with aqueous alkali aluminate. This embodiment of the process is carried out in accordance with German Auslegeschrift 12 03 238. The granulate is treated at around 20° to 100° C. with an aqueous solution which contains, per mole of binder based on $SiO_2$, at least 0.3 mole of $Al_2O_3$ as aluminate and from 1.5 to 10 moles of alkali hydroxide per liter. In this way, the silica-bound granules are converted into binder-free granulate distinguished by extreme hardness, a very high adsorption capacity and a very small dust component.

In another embodiment of the invention, the granulate may be subjected to an ion exchange before activation. To this end, the granulate is brought into contact with solutions which may contain, for example, Ca, Mg, Sr, Ba, Li, K, transition metal cations, lanthanides and-/or Zn, Cd.

The process according to the invention may also be used for the production of spherical $SiO_2$-bound granulates from powder-form solids other than molecular sieves, such as for example $SiO_2$-fillers, aluminas, finely divided clay minerals, finely ground glasses, colored pigments, metal oxides or the like.

The process according to the invention is illustrated by the following Examples.

EXAMPLE 1

30 kg of sodium zeolite A having a water content (ignition loss) of 19% by weight were processed with 15 l of 30% silica sol (BET-surface approx. 300 g/m$^2$) in an intensive mixer to form a granulate having a grain size of from about 0.1 to 0.8 mm. This pre-granulate was introduced into a granulation pan.

Finely powdered zeolite A was then continuously introduced in measured quantities into the rotating pan whilst at the same time 30% silica sol was being sprayed onto the moving granulate elsewhere in the pan. A stream of waterglass was introduced through an injector into the silica sol so that a volume ratio of sol to waterglass of 10:1 was adjusted. A 2 to 3 mm spherical granulate was obtained. The moist granulate was dried at 100° C., sieved and heated to 400° C. in a shaft furnace. Thereafter it had an ignition loss of 1.5% by weight and a breaking hardness of 4 kg (as determined on 3 mm diameter beads).

EXAMPLE 2

30 kg of sodium zeolite A having a water content (ignition loss) of 19.5% by weight are processed with 14 l of 25% silica sol (BET-surface 200 m$^2$/g) in an intensive mixer to form a granulate having a grain size of form 0.1 to 0.8 mm. The pre-granulate was introduced into a granulation pan.

Finely powdered zeolite A (ignition loss 19.5% by weight) was then continuously introduced via a metering unit into the rotating pan whilst at the same time more of the 25% silica sol was being sprayed onto the moving granulate elsewhere in the pan. A stream of waterglass was added to and mixed with the silica sol through an injector with a following mixing chamber so that a volume ratio of sol to waterglass of 5:1 was adjusted, producing a gelation time for the sol of about 15 to 20 secs. The effect of this short gelation time was that a spherical granulate having a particle size of from 0.5 to 2 mm was obtained, the percentage of this grain fraction amounting to ≧70%.

EXAMPLE 3

30 kg of sodium zeolite A having a water content (ignition loss) of 21% by weight was processed with 12 l of 28% silica sol (BET-surface 350 m$^2$/g) in an intensive mixer to form a granulate having a grain size of from 0.1 to 0.9 mm. This pre-granulate was introduced into a granulation pan.

Finely powdered zeolite A (ignition loss 21% by weight) was then continuously introduced via a metering unit into the rotating pan whilst at the same time more of the 28% silica sol was being sprayed onto the moving granulate elsewhere in the granulation pan. A stream of waterglass was introduced through an injector into the silica sol so that a volume ratio of sol to waterglass of 12:1 was adjusted, producing a gelation time of the sol of from 1 to 1.5 mins. The effect of this long gelation time was that spherical granulate having a grain size of from 3 to 5 mm was obtained. The yield of this fraction amounted to 80–90% of the total quantity of granulate.

EXAMPLE 4

30 kg of sodium zeolite X having a water content (ignition loss) of 25% was processed with 15 l of 30% silica sol (BET-surface approx. 300 m$^2$/g) in an intensive mixer to form a granulate having a grain size of from about 0.1 to 0.7 mm. This pre-granulate was introduced into a granulation pan.

Finely powdered zeolite X was then continuously introduced into the rotating pan whilst at the same time more of the 30% silica sol was being sprayed onto the moving granulate elsewhere in the pan. A stream of waterglass was introduced into the silica sol through an injector so that a volume ratio of sol to waterglass of 9:1 was adjusted. A 2 to 4 mm spherical granulate was obtained.

What is claimed is:

1. In a process for the production, in the presence of alkali metal silicate, of a silica-bound zeolite granulate, comprising granulating finely powdered solid zeolite in a continuously operated granulation pan with an aqueous silica sol having a SiO$_2$-particle content of more than 5% by weight of the aqueous silica sol and a specific surface area of the SiO$_2$-particles in said sol of greater than 100 m$^2$/g, which sol is sprayed on said finely powdered zeolite on said granulation pan and thereafter drying the resultant granulate, the improvement wherein undesirable gel formation which would result in blockage of the spray nozzle is avoided by adding said alkali metal silicate to said aqueous silica sol, as aqueous alkali metal silicate, through an injector immediately before said sol is sprayed on said powdered zeolite on said granulation pan, the injection being such as to rapidly provide a homogeneous mixture of the silicate and the sol, said aqueous alkali metal silicate being added to said sol in such amount that the alkali metal oxide: SiO$_2$ mol ratio in the sol sprayed on said powdered zeolite on said granulation pan is from 1:5 to 1:80.

2. A process according to claim 1 wherein said aqueous alkali metal silicate is added to said sol in such an amount that said alkali metal oxide: SiO$_2$ mol ratio is from 1:10 to 1:50.

3. A process according to claim 1 wherein the resultant zeolite granulate is subjected to a heat treatment at 30° to 50° C.

4. A process according to claim 1 wherein the resultant granulate is treated with a alkali metal aluminate to provide a high-hardness binder-free granulate.

5. A process according to claim 1 wherein the process is performed by forming a pre-granulate of said zeolite by mixing a quantity of said zeolite with silica sol, introducing said pre-granulate into a granulation zone, adding additional zeolite to said granulation zone and to said granulation zone adding additional silica sol to which said alkali metal silicate has been added immediately preceding its introduction into said granulation zone.

6. A process according to claim 1 wherein the BET surface area of the particles of said sol is 200 to 600 m$^2$/g.

7. A process according to claim 1 wherein said silica sol has a SiO$_2$ particle concentration of 5 to 40% by weight.

8. A process according to claim 1 wherein said silica sol has a SiO$_2$ particle concentration of 10 to 30% by weight.

9. A process according to claim 1 wherein said zeolite is selected from the group consisting of zeolite A, zeolite X, zeolite Y, erionite, zeolite L, mordenite, zeolite T, chabasite.

10. A process according to claim 9 wherein said zeolite is zeolite A.

11. A process according to claim 9 wherein said zeolite is zeolite X.

* * * * *